United States Patent [19]

Stapleton et al.

[11] 3,834,822

[45] Sept. 10, 1974

[54] METHOD AND APPARATUS FOR SURFACE DEFECT DETECTION USING DETECTION OF NON-SYMMETRICAL PATTERNS OF NON-SPECULARLY REFLECTED LIGHT

[75] Inventors: Thomas T. Stapleton, Bloomfield Hills; Reed A. Farrar, Southfield, both of Mich.

[73] Assignee: General Motors Corporation, Detroit, Mich.

[22] Filed: Mar. 29, 1973

[21] Appl. No.: 345,959

[52] U.S. Cl.............. 356/200, 250/563, 250/572, 356/210, 356/212
[51] Int. Cl...................... G01n 21/16, G01n 21/48
[58] Field of Search .......... 356/200, 210, 237, 212; 250/219 D F, 572, 563

[56] References Cited
UNITED STATES PATENTS 2,730,922  1/1956  Beard.................................. 356/237
3,474,254  10/1969  Piepenbrink et al................ 356/200
3,748,047  7/1973  Millgard et al............... 250/219 DF

FOREIGN PATENTS OR APPLICATIONS 894,570  4/1962  Great Britain................ 250/219 DF Primary Examiner—Vincent P. McGraw
Attorney, Agent, or Firm—Warren D. Hill

[57] ABSTRACT

A cylindrical metal object to be inspected for surface defects is rotated about its axis and a collimated laser beam is axially scanned across the object surface in a plane normal to the surface. A plurality of photoelectric detectors are symmetrically arranged on each side of the scanning plant to detect light non-specularly reflected from the object. Defects causing an unsymmetrical reflection to the detectors are sensed by summing the outputs of symmetrically disposed pairs of detectors and comparing the summed outputs to determine significant differences in the summed outputs and producing a defect signal when such differences occur.

5 Claims, 3 Drawing Figures

PATENTED SEP 10 1974  3,834,822

METHOD AND APPARATUS FOR SURFACE DEFECT DETECTION USING DETECTION OF NON-SYMMETRICAL PATTERNS OF NON-SPECULARLY REFLECTED LIGHT

This invention relates to surface inspection and particularly to a method and apparatus for optoelectronic surface defect detection.

It has been known to inspect a surface for defects by illuminating the surface with a light source and scanning the surface by a light detector to monitor the reflected light intensity from each portion of the surface scanned. Variations in the detector output beyond specified levels are indicative of a defect. In such an arrangement, the contrast between a defective surface and a normal surface is often poor resulting in small output variations and a low signal to noise ratio making it difficult to distinguish defects from normal surfaces. In addition certain surface conditions such as stains, dirty or burnished surfaces which do not in any way affect the integrity of the surface are falsely interpreted as defects.

It has been found that the shortcomings discussed above can be obviated by examining light non-specularly reflected from the object surface for symmetry. A non-symmetrical light pattern indicates a defect while a stained, dirty or burnished surface merely changes the light intensity but does not alter the symmetrical pattern on a normal surface.

It is therefore an object of this invention to provide a method and apparatus for detecting surface defects on reflecting objects which are insensitive to stains and other conditions which affect only reflected light intensity.

It is another object of this invention to provide a method and apparatus for inspecting a reflecting surface for defects by the examination of the symmetry of the pattern of non-specularly reflected light.

The invention is carried out by the method of scanning a surface to be detected by a light beam, inspecting the pattern of non-specular light reflected from the surface and determining the symmetry of the pattern. The invention is further carried out by providing a light beam for scanning the surface to be inspected, a plurality of light detectors symmetrically arranged to detect light non-specularly reflected from the surface such that the detectors have balanced outputs when the light is reflected from a normal surface and unbalanced outputs when the lights are reflected from a defective surface, and a comparator circuit for comparing the detector outputs to provide a defect signal when the outputs are unbalanced.

The above and other advantages will be made more apparent from the following specification taken in conjunction with the accompanying drawings wherein like reference numerals refer to like parts and wherein.

Figure 1:
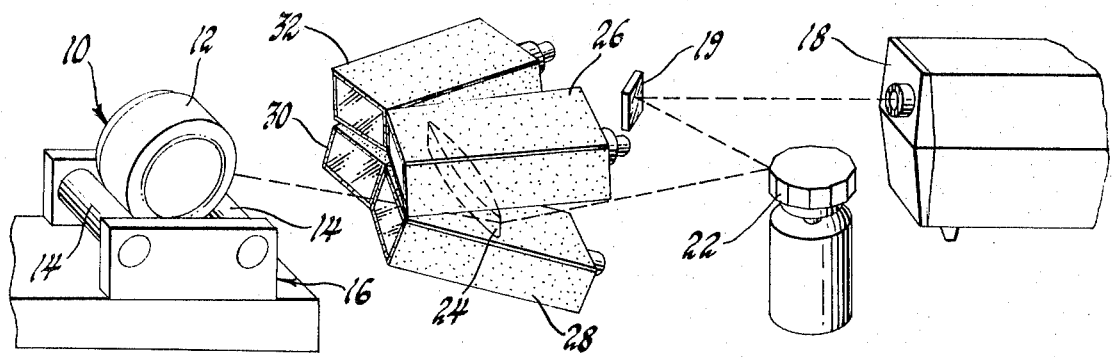
FIG. 1 is a perspective view of an apparatus according to the invention.

FIG. 1 shows a cylindrical object 10 having a cylindrical outer surface 12 to be inspected. The object is rotatably supported by a pair of rollers 14 mounted in a fixture 16. The rollers are motor driven by means not shown to effect continuous rotation of the object 10. A collimated light beam produced by a laser 18 is reflected from a stationary mirror 19 and then from a motor driven sixteen-sided mirror 22, thence it is directed from a beam directing lens 24 onto the cylindrical surface 12. As is well known in the art, the sixteen-sided mirror upon rotation will cause the light beam to repeatly scan the light beam across the surface 12. The scanning apparatus is so situated relative to the object 10 that the scanning beam lies in a plane normal to the surface 12, i.e., the plane intersects the axis of the cylindrical object 10. Photoelectric detector modules 26 through 32 are symmetrically arranged with respect to the plane of the scanning light beam as well as to a central plane normal to the plane of the light beam and intersecting the center of the cylindrical surface 12. Thus the detectors 26 and 32 lie above the plane of the light beam and are sufficiently spaced from the detectors 28 and 30 below the light beam to allow free passage of the light beam.

Figure 2:
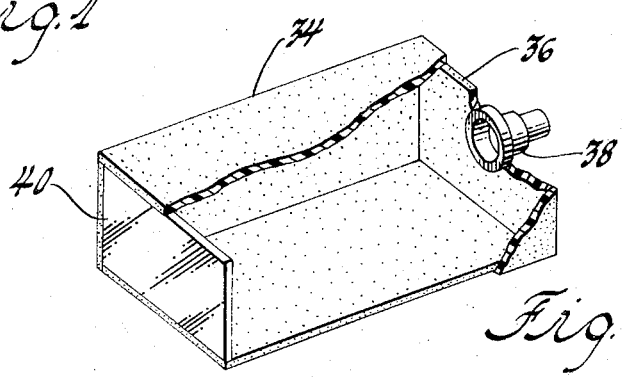
FIG. 2 is a partly broken away perspective view of a detector of FIG. 1.

FIG. 2 shows one of the detectors 26 through 32 of FIG. 1. The detector comprises a four-sided box 34 having a back plate 36 supporting a photoelectric detector 38. The front of the box 34 supports a Fresnel lens 40. The lens 40 serves to gather the light reflected from the cylinder 12 and focus it onto the photoelectric detector 38.

In operation of the apparatus as thus far described, the light beam scanning the surface 12 is specularly reflected back into the plane of the light beam so that such light is not sensed by the detectors. Non-specular light will be reflected from the surface 12 in a symmetrical pattern which will evenly illuminate the four detectors when the surface 12 is not defective. In the event the surface 12 is stained, dirty or burnished, the overall intensity of the light sensed by the detectors will change but the symmetrical pattern will not change. On the other hand, when the surface 12 contains a scratch, gouge, ridge or other defect, the pattern of non-specular light becomes unsymmetrical so that the detectors are not evenly illuminated. The outputs of the detectors then can be compared to determine whether the detector illumination is balanced.

Figure 3:
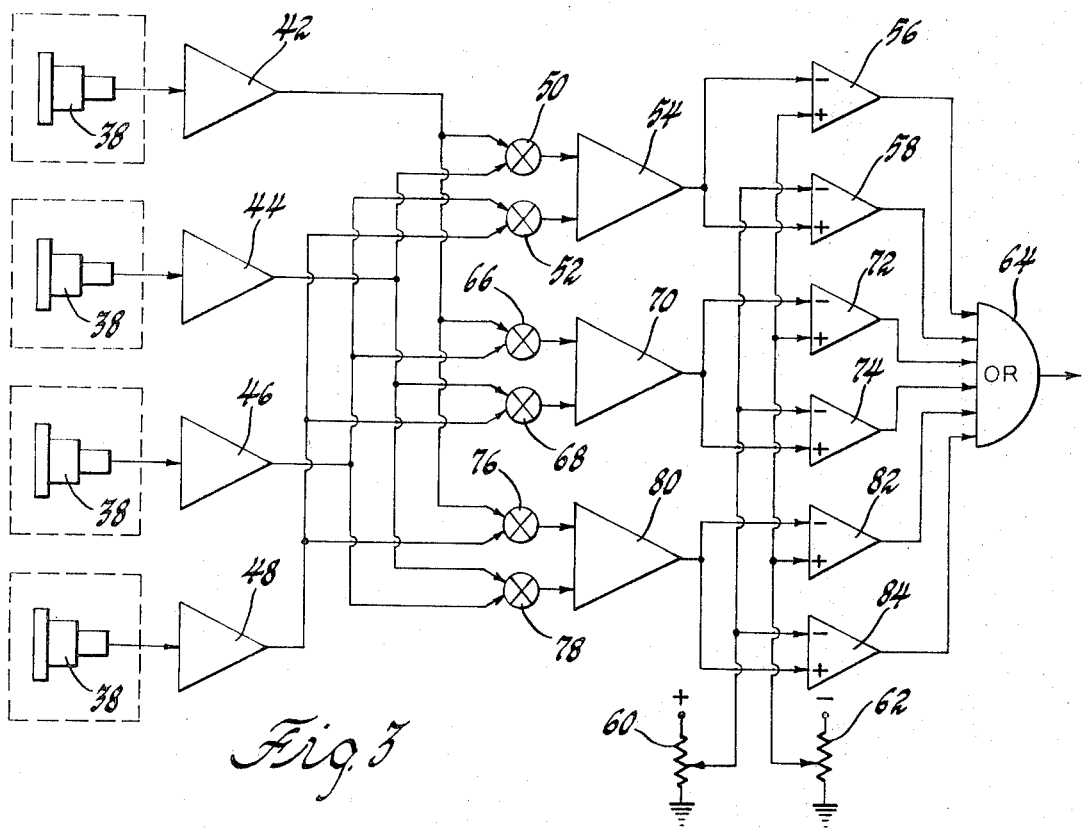
FIG. 3 is a schematic diagram of an electrical circuit according to the invention.

The comparison of the detector outputs is carried out by summing the outputs of a symmetrical pair of detectors and comparing that summed output with the summed output of an opposite pair of detectors to determine whether a significant difference exists in the summed outputs. Simultaneously the detector outputs are paired in other combinations for the same purpose. It will be seen that an array of four detectors arranged symmetrically can be matched in three different combinations of pairs thereby determining whether symmetry is lacking with respect to the plane of the scanning beam, the plane normal thereto or with respect to the axis defined by the intersection of those planes. Specifically, as seen in FIG. 3, the detectors modules 26, 28, 30 and 32 each have their outputs connected to amplifiers 42, 44, 46 and 48 respectively. The outputs of the amplifiers 42 and 44 are added at a summing point 50 while the outputs of amplifiers 46 and 48 are summed at the junction point 52. The resulting summed signals are compared by a differential amplifier 54 to determine the difference in the summed signals. The output of the amplifier 54 is fed to two comparators 56 and 58 each being supplied by a reference voltage from potentiometers 60 and 62 which are suppled by positive and negative voltages respectively. Thus the comparators 56 and 58 determine whether the difference signal from the differential amplifier 54 is within allowable preset limits. If so, there is no output from either comparator 56 or 58. However, should the limit be exceeded in one of the comparators, a signal will be fed to an OR gate 64 which produces an output signal indicating a surface defect. In this manner the symmetry of light with respect to the plane normal to the plane of the light beam is determined. In a similar manner the outputs of amplifiers 42 and 46 are combined at a junction point 66 while the outputs of the amplifiers 44 and 46 are combined at a junction point 68 so that with the aid of the differential amplifier 70 and the comparators 72 and 74 the outputs of detector modules 28 and 32 are summed and compared with the sum of detector modules 26 and 30 to check for cross symmetry of non-specularly reflected light pattern. Similarly the outputs of the amplifiers 42 and 48 are summed at junction point 76 and the outputs of amplifiers 44 and 46 are summed at a summing point 78 so that with the aid of the differential amplifier 80 and the comparators 82 and 84, the detected light above the plane of the light beam is compared with that below the plane of the light beam.

It will be seen then that when a flaw on the surface 12 causes a departure from symmetry of the non-specularly reflected light and the departure exceeds the limits set in the comparators, the OR gate 64 will produce a signal indicating a defect. The defect signal will be used as desired to operate a warning signal, a reject mechanism, or a recording device. On the other hand when the surface 12 contains a stain, dirt or a burnish mark, the intensity of the light will depart from the normal for an equal amount at each of the detectors so that the circuit will sense no differential change of light intensity and no defect signal is rendered due to those harmless marks. It should further be noted that the system according to this invention will be insensitive to changes of the light beam intensity so that strict regulation of the light source and scanning apparatus is not required as it would be in many other optical surface detector arrangements.

The embodiment of the invention described herein is for purposes of illustration and the scope of the invention is intended to be limited only by the following claims:

It is claimed:

1. A method for detecting defects in the surface of a reflective object wherein the defects cause an unsymmetrical non-specular reflection of incident light comprising the steps of
    scanning the object surface with a collimated beam of light,
    detecting the intensity of light non-specularly reflected from the surface at several symmetrically located detecting zones and producing an electrical signal at each zone corresponding to the light intensity,
    and detecting non-symmetrical patterns of non-specularly reflected light by comparing the electrical signals thereby providing an indication of the presence of surface defects.

2. A method for detecting defects in the surface of a reflective object wherein the defects cause an unsymmetrical non-specular reflection of incident light comprising the steps of
    scanning the object surface with a collimated beam of light moving in a plane normal to the surface,
    detecting the intensity of light non-specularly reflected from the surface by several detectors symmetrically located relative to the normal plane and producing an electrical signal from each detector corresponding to the light intensity,
    summing the electrical signals from symmetrically located pairs of detectors and
    detecting non-symmetrical patterns of non-specularly reflected light by comparing the summed signals thereby providing an indication of the presence of surface defects when differences between the summed signals exceed a predetermined value.

3. An optical surface defect detector for inspecting a reflecting object for defects causing an unsymmetrical non-specular reflection of incident light and nonresponsive to surface conditions causing only a change in reflected light intensity comprising,
    means for focusing a light beam on an object to be inspected and for scanning the beam across the object surface,
    a plurality of photoelectric detectors symmetrically arranged relative to the path of the beam specularly reflected from the object for sensing the pattern of non-specular reflected light, and for producing electrical output signals according to the light incident on the detectors,
    electrical means for comparing the outputs of symmetrical combinations of the detectors to determine the presence of unbalanced outputs caused by unsymmetrical patterns of non-specular reflected light,
    and an output means responsive to the electrical means for providing a defect signal when a surface defect causes the non-specular reflected light to assume a non-symmetrical pattern.

4. An optical surface defect detector for inspecting a reflecting object for defects causing an unsymmetrical non-specular reflection of incident light and nonresponsive to surface conditions causing only a change in reflected light intensity comprising,
    means for focusing a light beam on an object to be inspected and for scanning the beam across the object surface, the beam being moved in a plane normal to the object surface such that light specularly reflected from the object will be in the normal plane,
    a plurality of photoelectric detectors symmetrically arranged on each side of the normal plane for sensing the pattern of non-specular reflected light, and for producing electrical output signals according to the light incident on the detectors,
    electrical means for comparing the outputs of symmetrical combinations of the detectors to determine the presence of unbalanced outputs caused by unsymmetrical patterns of non-specular reflected light,
    and an output means responsive to the electrical means for providing a defect signal when a surface defect causes the non-specular reflected light to assume a nonsymmetrical pattern.

5. An optical surface defect detector for inspecting a reflecting object for defects causing an unsymmetrical non-specular reflection of incident light and nonresponsive to surface conditions causing only a change in reflected light intensity comprising, means for focusing a light beam on an object to be inspected and for scanning the beam across the object surface, the beam being moved to the object surface such that the light specularly reflected from the object will be in the normal plane, at least four photoelectric detectors symmetrically arranged two on each side of the normal plane for sensing the pattern of non-specular reflected light and for producing electrical signals according to the light incident on the detectors, electrical means for summing the signals from symmetrical pairs of detectors, and comparator means for comparing the summed signals of opposed pairs to determine the presence of unbalanced signals caused by unsymmetrical patterns of non-specular reflected light, the comparator means producing output signals when the difference between the summed signals of opposed detector pairs exceeds a predetermined amount, and an output means responsive to the comparator output signals for providing a defect signal when a surface defect causes the non-specular reflected light to assume a nonsymmetrical pattern.

* * * * *